Nov. 28, 1950      J. E. HAMMEL      2,531,811
COULOMBMETER
Filed July 28, 1948
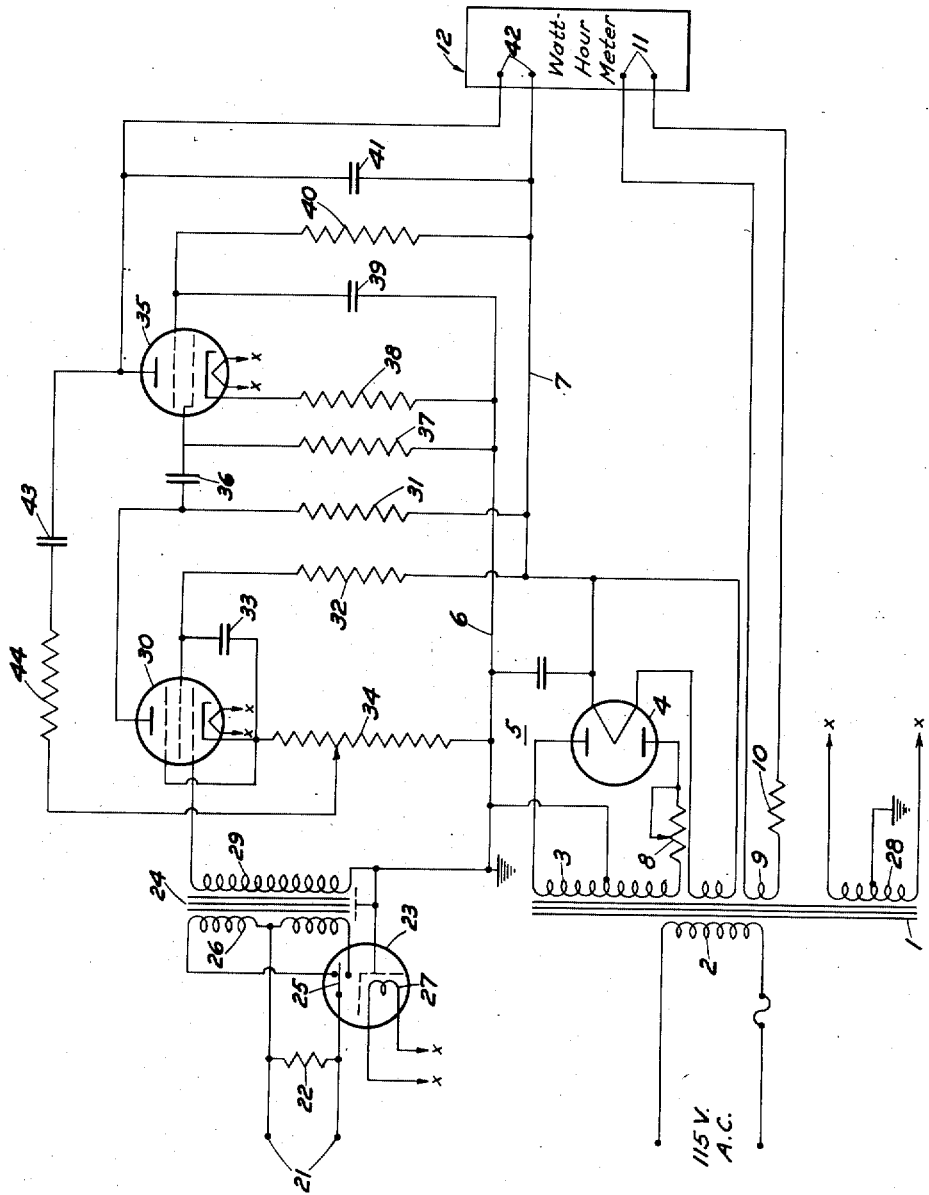
INVENTOR.
Jay E. Hammel
BY
Roland A. Anderson
Attorney Patented Nov. 28, 1950

2,531,811

UNITED STATES PATENT OFFICE 2,531,811

COULOMBMETER

Jay E. Hammel, Oak Ridge, Tenn., assignor, by mesne assignments, to the United States of America as represented by the United States Atomic Energy Commission Application July 28, 1948, Serial No. 41,011

3 Claims. (Cl. 171—34)

This invention relates generally to the measurement of weak electrical signals, and, more particularly, to a coulombmeter for indicating the time integral of a weak current or voltage signal.

Previously, it has been known to employ an alternating current watt-hour meter for the purpose of indicating the time integral of a weak electrical current. Such employment of an alternating current watt-hour meter as a coulombmeter has heretofore been accomplished by constantly energizing one coil of the watt-hour meter while energizing the other coil with an alternating current signal proportional to the direct current signal to be measured. In prior systems, however, the conversion of the input direct current to the required proportional alternating current has been accomplished by means of saturable reactors, such a system being disclosed in U. S. Patent No. 2,338,423 entitled "Apparatus for Measuring Direct Currents or Voltages," issued January 4, 1944, in the name of Wilhelm Geyger. However, as is well known, saturable reactors are inherently non-linear devices, and, in attempting to avoid the resulting inaccuracies inherent in instruments utilizing saturable reactors as direct current to alternating current converters, undesirable complications and cumbersome devices have always resulted in the past.

According to present invention, the conversion of the input direct current to a proportional alternating signal is accomplished by means of a vibrating type converter in conjunction with a step-up transformer. By utilizing such a conversion system, the coulombmeter of the present invention is extremely accurate in operation and at the same time simple with respect to fabrication and construction. A special electronic amplifying system has been provided in order to amplify the alternating signal prior to its connection to the alternating current watt-hour meter. In this manner, an extremely accurate and sensitive instrument is provided which at the same time is much simpler than corresponding devices of the prior art.

Accordingly, it is the primary object of the present invention to provide accurate and sensitive means for indicating the time integral of a weak electrical signal.

Other objects and advantages of the present invention will become apparent from the following description, when taken in connection with the accompanying drawing, wherein the single figure is a wiring and schematic diagram of the coulombmeter of the present invention.

Referring now to the single figure of the drawing, a main power transformer 1 is provided having its primary winding 2 energized from a suitable 115 volt alternating current source, which is preferably regulated. One center tapped secondary winding 3 of transformer 1 is connected to opposite plates of a full wave rectifier tube 4, preferably type 5Y3. Vacuum tube 4, in conjunction with the remaining portions of the circuit, forms a conventional direct current power supply, indicated generally at 5, which provides between its output leads 6 and 7 a direct current plate supply voltage for the electronic amplifying system.

As is well known, all commercially available center tapped transformer windings may be subject to a small unbalance. In order to eliminate the effects of this unbalance on the operation of the coulombmeter, a small adjustable resistor 8 is connected in series with one leg of the winding 3. Resistor 8 is then adjusted so as to cancel out any unbalance which might be present, the setting of the adjustable contact arm of resistor 8 being dependent upon the unbalance characteristics of the particular winding 3. By eliminating such unbalance, 60 cycle ripple which would otherwise appear in the direct current plate supply voltage between leads 6 and 7, is completely avoided.

Another secondary winding 9 of transformer 1, producing perhaps one or two volts across its terminals, is connected through resistor 10 directly to the current coil terminals 11 of an alternating current watt-hour meter, schematically indicated at 12. In this way, the current coil of the watt-hour meter is known to be constantly energized at a predetermined current value.

Input terminals 21 are intended to be connected in series in the external circuit through which flows the weak direct current which it is desired to measure or integrate. A resistor 22 is connected directly across these terminals 21 so as to produce a direct voltage signal proportional to the input direct current. Reference numeral 23 generally indicates a commercially available vibrating type relay actuated converter which is intended to be employed with a step-up transformer 24, also commercially available, for the purpose of converting direct current to a proportional alternating current. Included within the converter 23 is a switch 25 having its fixed end connected to one side of resistor 22 and its movable end connectable, depending upon the position of the switch, to opposite terminals of the center tapped primary winding 26 of transformer 24. The center tap of primary winding 26 is connected to the other side of resistor 22. A relay winding 27 is also included within converter 23. Winding 27 is intended to be energized from an alternating current source which may be obtained from secondary winding 28 of main power transformer 1. Winding 27 and switch 25 operate in the conventional manner as a relay, such that the position of switch 25 depends upon the direction of energization of winding 27, that is, upon the direction of the alternating current in the winding at any particular time.

In operation, it will be apparent that the lower side of resistor 22 is first connected to the upper terminal of winding 26 and then connected to the lower terminal of this winding, and so on. Accordingly current proportional to the direct current input signal flows through winding 26 first in one direction in the upper half of the winding, and then in the other direction in the lower half of the winding. As a result of this periodically reversing flow of current through primary winding 26, a 60 cycle alternating square wave voltage signal is developed across the output terminals of secondary winding 29 of transformer 24, the amplitude of which is proportional to the direct current input signal.

One terminal of winding 29 is connected to direct current plate supply lead 6, which is grounded, as shown, and the other terminal of winding 29 is connected to the control grid of an electronic amplifying vacuum tube 30, which is preferably type 6SJ7. The plate of vacuum tube 30 is connected through a load resistor 31 to the positive plate supply lead 7. The screen grid of vacuum tube 30 is connected through resistor 32 to positive lead 7, and this grid is also connected through a condenser 33 to the cathode. The cathode of tube 30 is connected to ground through adjustable feed-back resistor 34. The suppressor grid of tube 30 may also be connected to the cathode, as shown.

The output of amplifier 30 is resistance-capacitance coupled to the control grid of a second amplifying tube 35, preferably type 6V6. The coupling circuit comprising coupling condenser 36 and coupling resistor 37. The cathode of vacuum tube 35 is also connected to ground through a feed-back resistor 38. The screen grid of vacuum tube 35 is connected to ground through condenser 39, and is also connected to the positive supply lead 7 through a resistor 40.

Connected between the plate of vacuum tube 35 and the positive supply lead 7 there is a parallel resonant circuit consisting of a condenser 41 and the voltage coil of the alternating current watt-hour meter 12. It will be understood that terminals 42 of the watt-hour meter connect to the voltage coil thereof. This parallel resonant circuit comprises the output load impedance for the amplifying circuit of vacuum tube 35. The effect of this parallel resonant circuit is simultaneously to provide a maximum voltage output for the voltage coil of the watt-hour meter, and also to smooth out the square wave form of this output alternating voltage.

The plate of vacuum tube 35 is also connected through a condenser 43 and resistor 44 to an adjustable point on resistor 34 in the cathode circuit of vacuum tube 30, this circuit providing an adjustable negative feed-back network from the output of the second stage of the amplifying system to the input of the first stage. The effect of this adjustable negative feed-back network, and also the negative feed-back provided in each amplifying stage by cathode resistors 34 and 38, respectively, is to improve the overall linearity and stability of the amplifying system.

Thus, it will be apparent that by means of converter 23 and step-up transformer 24, the input direct current to be measured is initially converted to an amplified square wave alternating voltage having an amplitude proportional to the direct current input. This square wave alternating voltage is then further amplified by means of amplifying tubes 30 and 35 and their associated circuits. The amplified output of vacuum tube 35 is then simultaneously further amplified and at the same time smoothed by the action of the parallel resonant circuit consisting of condenser 41 and the voltage coil of the watt-hour meter 12. Accordingly, there is finally applied to the voltage coil of the alternating current watt-hour meter an alternating voltage proportional to, but very much amplified with respect to, the original direct current input signal.

Since the current flowing through the current coil of the watt-hour meter 12 is constant, the meter reading will necessarily be proportional to the time integral of the voltage applied to the voltage coil thereof, and, therefore, the reading will be an accurate measure of the integral of the direct current input signal. By choosing a suitable ratio of disc-to-dial speed for the watt-hour meter, and by choosing proper circuit constants for the above-described apparatus, the watt-hour meter 12 can be made to read directly in milliampere-hours. Should the actual value of the direct current input be desired rather than the time integral thereof, it would, of course, be possible to permit the watt-hour meter to integrate for a known period of time, and then divide the reading by this known time, whereby the average value of the input direct current would be obtained.

Since the current coils of the watt-hour meter is supplied from a commercially available 115 volt alternating current source, which, of course, contains only odd harmonics, the 120 cycle ripple which exists in the voltage coil as a result of the full wave rectification of circuit 5, has no effect on the meter reading. On the other hand any 60 cycle ripple in the voltage coil would cause the meter to creep at zero direct current input signal since the current coil is energized at 60 cycles. For this reason, the adjustable resistor 8 is provided in rectifier circuit 5 to insure that no 60 cycle ripple appears across plate supply leads 6 and 7 to be reflected to the voltage coil of the watt-hour meter.

While for the purpose of illustrating the invention a specific embodiment has been described, it is to be understood that other embodiments are contemplated as coming within the invention, the scope for which is limited only by the appended claims.

What is claimed is:

1. A coulombmeter for indicating the time integral of a direct current, comprising a resistive input circuit for deriving a direct voltage proportional to said direct current input, conversion means, including a vibrating switch and a step-up transformer, for periodically reversing the effective direction of said direct voltage thereby providing a proportional square wave alternating voltage, electronic amplifying means for said square wave alternating voltage, said amplifying means including voltage and current feed-back circuits, filter means responsive to said amplified square wave voltage for providing a proportional smoothed alternating voltage, an alternating current watt-hour meter having a voltage and a current coil, means for energizing one of said coils from said smoothed alternating voltage, and means for constantly energizing the other of said coils.

2. A coulombmeter for indicating the time integral of a direct current, comprising a resistive input circuit for deriving a proportional voltage from said direct current input, conversion means, including a vibrating switch and a step-up transformer, connected to said input circuit for periodically reversing the effective direction of said direct voltage, thereby providing a proportional square wave alternating voltage, electronic amplifying means for said alternating voltage, said amplifying means including voltage and current feed-back circuits, a full wave electronic rectifier circuit for providing the plate supply voltage for said amplifying means, said rectifier circuit including a variable impedance connected in one leg of its center tapped transformer, filter means responsive to said amplified square wave voltage for providing a proportional smoothed alternating voltage, an alternating current watt-hour meter having a voltage and a current coil, means for energizing one of said coils from said smoothed alternating voltage, and means for constantly energizing the other of said coil.

3. A coulombmeter for indicating the time integral of a direct current, comprising an input circuit for receiving said direct current, conversion means connected to said input circuit for deriving a square wave alternating voltage having an amplitude proportional to said direct current, an alternating current watt-hour meter having a voltage and a current coil, a capacitance connected across said voltage coil to form a parallel resonant circuit, means for connecting the square wave alternating voltage output of said conversion means to said parallel resonant circuit, and means for constantly energizing said current coil.

JAY E. HAMMEL.

REFERENCES CITED

The following references are of record in the file of this patent:

UNITED STATES PATENTS

| Number | Name | Date |
|---|---|---|
| 1,772,091 | Stein | Aug. 5, 1930 |
| 2,338,423 | Geyger | Jan. 4, 1944 |
| 2,413,788 | Sargeant et al. | Jan. 7, 1947 |
| 2,442,298 | Liston | May 25, 1948 |